(12) United States Patent
Wang et al.

(10) Patent No.: US 12,050,346 B2
(45) Date of Patent: Jul. 30, 2024

(54) GRADUAL FIBER CLADDING LIGHT STRIPPER AND ITS MANUFACTURING METHOD

(71) Applicant: BRIMO TECHNOLOGY INC., Taipei (TW)

(72) Inventors: Ding-Jun Wang, Taipei (TW); Wen-Kai Xu, Taipei (TW)

(73) Assignee: BRIMO TECHNOLOGY INC., Taipei (TW)

( * ) Notice: Subject to any disclaimer, the term of this patent is extended or adjusted under 35 U.S.C. 154(b) by 0 days.

(21) Appl. No.: 17/736,679

(22) Filed: May 4, 2022

(65) Prior Publication Data
US 2023/0185025 A1   Jun. 15, 2023

(30) Foreign Application Priority Data
Dec. 14, 2021   (TW) ................. 110146795

(51) Int. Cl.
| | |
|---|---|
| *G02B 6/24* | (2006.01) |
| *B01J 19/12* | (2006.01) |
| *G02B 6/245* | (2006.01) |
| *G02B 6/25* | (2006.01) |
| *G02B 6/255* | (2006.01) |
| *C03C 25/6226* | (2018.01) |

(52) U.S. Cl.
CPC ............ *G02B 6/245* (2013.01); *B01J 19/123* (2013.01); *G02B 6/25* (2013.01); *G02B 6/2551* (2013.01); *C03C 25/6226* (2013.01)

(58) Field of Classification Search
None
See application file for complete search history.

(56) References Cited

FOREIGN PATENT DOCUMENTS

| | | | |
|---|---|---|---|
| CN | 106959489 | * | 5/2017 |
| CN | 108604532 | * | 9/2018 |
| CN | 110304822 | * | 10/2019 |
| CN | 113608301 | * | 7/2021 |
| TW | 202016594 | * | 5/2020 |
| WO | WO-2019080050 A1 | * | 5/2019 ............... G02B 6/02 |

* cited by examiner

*Primary Examiner* — Mandy C Louie
(74) *Attorney, Agent, or Firm* — MUNCY, GEISSLER, OLDS & LOWE, P.C.

(57) ABSTRACT

A gradual fiber cladding light stripper and its manufacturing method is disclosed to include an optical fiber that has a core, a cladding outside the core and an outer coating outside the cladding, the outer coating being removed by a preset cutting fixture to form a pre-stripping section, and a recoating section coated on the surface of the pre-stripping section at one time with a covering glue, the covering glue being irradiated and cured through a preset light curing device to form the recoating section with a gradual light stripping rate. The recoating section has a laser light input terminal with a relatively lower light stripping rate, and a laser light output terminal with a relatively higher light stripping rate.

1 Claim, 15 Drawing Sheets

---

Provide an optical fiber, which comprises a core, a cladding, and an outer coating from the inner layer to the outer layer, and the outer coating is removed by a preset cutting fixture to form a pre-stripping section. — 61

Provide a covering glue, which is coated on the surface of the pre-stripping section at one time to form a recoating section, and the recoating section is irradiated and cured through a preset light curing device. The preset light curing device comprises a light source that can emit ultraviolet light, and an attenuator provided on one side of the light source to receive the ultraviolet light and generate a gradual irradiation intensity. The ultraviolet light passing through the attenuator forms a light spot irradiated on the ring-shaped recoating section, so that the recoating section can be uniformly irradiated by the light spot to form the recoating section with a gradual light stripping rate. The recoating section has a laser light input terminal with a lower light stripping rate and a laser light output terminal with a higher light stripping rate. ---- 62

Provide an optical fiber, which comprises a core, a cladding, and an outer coating from the inner layer to the outer layer, and the outer coating is removed by a preset cutting fixture to form a pre-stripping section. — 41

Provide a covering glue, which is coated on the surface of the pre-stripping section at one time, and the covering glue is irradiated and cured through a preset light curing device. The preset light curing device comprises a light source that can emit an ultraviolet light beam, a galvanometer set provided on the side of the light source to receive the ultraviolet light beam and generate a moving light spot, and a field lens arranged between the galvanometer set and the optical fiber to focus and homogenize the light spot, so that the covering glue can be uniformly irradiated by the light spot to form a recoating section with a gradual light stripping rate, and the recoating section has a laser light input terminal with a lower light stripping rate and a laser light output terminal with a higher light stripping rate. — 42

FIG. 6

Provide an optical fiber, which comprises a core, a cladding, and an outer coating from the inner layer to the outer layer, and the outer coating is removed by a preset cutting fixture to form a pre-stripping section. — 51

Provide a covering glue, which is coated on the surface of the pre-stripping section at one time, and the covering glue is irradiated and cured through a preset light curing device. The preset light curing device comprises a preset transfer fixture that moves along a preset track with a gradual movement of fast first and then slow or slow first and then fast. The preset transfer fixture is provided with a light source that can emit an ultraviolet light beam, so that the light source irradiates the covering glue to form a gradual exposure, and the covering glue forms a recoating section with a gradual light stripping rate that can be uniformly irradiated by the ultraviolet light beam, and the recoating section has a laser light input terminal with a lower light stripping rate and a laser light output terminal with a higher light stripping rate. — 52

FIG. 7

Provide an optical fiber, which comprises a core, a cladding, and an outer coating from the inner layer to the outer layer, and the outer coating is removed by a preset cutting fixture to form a pre-stripping section. — 61

Provide a covering glue, which is coated on the surface of the pre-stripping section at one time to form a recoating section, and the recoating section is irradiated and cured through a preset light curing device. The preset light curing device comprises a light source that can emit ultraviolet light, and an attenuator provided on one side of the light source to receive the ultraviolet light and generate a gradual irradiation intensity. The ultraviolet light passing through the attenuator forms a light spot irradiated on the ring-shaped recoating section, so that the recoating section can be uniformly irradiated by the light spot to form the recoating section with a gradual light stripping rate. The recoating section has a laser light input terminal with a lower light stripping rate and a laser light output terminal with a higher light stripping rate. — 62

*FIG.8*

Provide an optical fiber, which comprises a core, a cladding, and an outer coating from the inner layer to the outer layer, and the outer coating is removed by a preset cutting fixture to form a pre-stripping section. — 71

Provide a covering glue, which is coated on the surface of the pre-stripping section at one time to form a recoating section, and the recoating section is irradiated and cured through a preset light curing device. The preset light curing device comprises a light source that can emit ultraviolet light, and a mask, which is provided with a predetermined pattern inside, provided on the side of the light source to receive the ultraviolet light. The light source is set on one side of the mask at a predetermined inclination angle to generate a light spot with a gradual irradiation intensity. The predetermined pattern is a long rectangle and the light spot is close to an egg shape, so that the recoating section can be uniformly irradiated by the light spot. The recoating section has a laser light input terminal with a lower light stripping rate and a laser light output terminal with a higher light stripping rate. — 72

FIG. 9

GRADUAL FIBER CLADDING LIGHT STRIPPER AND ITS MANUFACTURING METHOD

This application claims the priority benefit of Taiwan patent application number 110146795, filed on Dec. 14, 2021.

BACKGROUND OF THE INVENTION

1. Field of the Invention

The present invention relates to a gradual fiber cladding light stripper and a manufacturing method thereof, especially it refers to a kind of optical fiber stripping rate that is controlled in stepwise sections to form a gradual structure with a lower stripping rate closer to the optical fiber injection point, and a higher stripping rate away from the optical fiber injection point. At the same time, the covering glue is coated on the surface of the pre-stripping section of the optical fiber at one time, and the method of controlling the curing parameters of the covering glue segment can greatly reduce the manufacturing process of the fiber cladding light stripper to achieve the purpose of reducing the production cost.

2. Description of the Related Art

With the advent of the high-tech era, the processing technology of industrial manufacturing and production has also been continuously improved. The conventional mechanical processing process can only process the appearance of the processed object, but the processing, engraving or cutting of the processed object cannot be completed. In addition, the drilling and cutting of chips, components, and thin plates of high-tech semiconductor products cannot be processed. Therefore, the laser processing process has been researched and developed, and the process is widely used. In fields such as medical treatment, high-precision industry, excitation detection, spectroscopy analysis or plasma dynamics, laser processing can be used for processing. Conventional laser processing is inevitable for mechanical clamping of the lens, high-precision translation stage, etc. However, the laser processing operation of pulsed light is carried out through the fiber laser, because the fiber laser has the advantages of compact structure, high efficiency, and can produce a laser spot with high beam quality, etc., fiber lasers are widely used in material processing. Because fiber laser has the advantages of very good stability, small size, easy to carry and easy to set up, it occupies a place in the application of optical communication, spectrum measurement and optical analysis. And because of its very high good collimation, high power and high light intensity, laser source processing systems are also widely used in the industry.

Moreover, the current low-order modal light is transmitted in the core of the optical fiber, and the high-order modal pump light is transmitted in the cladding of the optical fiber. The energy transmission of the optical fiber is to create a total reflection boundary condition between the high refractive index cladding and the lower refractive index outer coating, so that the light source can be transmitted in the optical fiber in the form of total reflection. However, in order to make the processed laser light have better beam quality, a cladding light stripper must be used to remove the high-order modal light in the fiber, leaving only the low-order modal light in the core with good beam quality.

However, in the structural design of the fiber cladding light stripper in general optical fibers, the fiber cladding light stripper usually removes the entire section of the outer coating outside of the cladding in the fiber, and then recoats a layer of covering glue with a higher refractive index than the original outer coating to make the re-coated part have a smaller numerical aperture or completely destroy its total reflection condition, so that the high-order modal light of the light source originally transmitted in the cladding will be lost in the re-coated section, so as to achieve the removal of the high-order modal light.

However, when the light source in the current optical fiber is injected into the fiber cladding light stripper, the injection point temperature will instantly rise to extremely high temperature, and the farther away from the injection point, the temperature will gradually level off. Therefore, when the energy of the input high-order modal light is too large, the fiber cladding light stripper is easily burned at the highest temperature of the injection point, causing heat to accumulate at this point and causing fiber burnout and subsequent system damage.

In addition, the greater the amount of fiber cladding stripped, the greater the heat energy generated by the high-order modal light when it is transmitted, and the faster the temperature rise rate. If the removed mount of the injection point cladding of the fiber cladding light stripper is too large, the temperature rise rate will be more rapid and the fiber will be more likely to be burnt. Therefore, how to dissipate the high-order modal light in sections has become the direction that relevant industries engaged in this industry urgently want to study and improve.

SUMMARY OF THE INVENTION

The present invention has been accomplished under the circumstances in view. It is therefore the main object of the present invention to provide a gradual fiber cladding light stripper, which comprises an optical fiber and a recoating section. The optical fiber comprises a core, a cladding outside the core, and an outer coating outside the cladding. The outer coating is removed by a preset cutting fixture to form a pre-stripping section. The recoating section is coated on the surface of the pre-stripping section at one time with a covering glue. The covering glue is irradiated and cured through a preset light curing device to form the recoating section with a gradual light stripping rate. The recoating section has a laser light input terminal with a relatively lower light stripping rate, and a laser light output terminal with a relatively higher light stripping rate. By controlling the stripping rate of the optical fiber in stepwise steps, the stripping rate closer to the laser light input terminal is lower, and the stripping rate farther from the laser light input terminal is higher. It avoids the burning of the optical fiber caused by the injection point of the fiber cladding light stripper due to the excessive stripping amount. At the same time, the covering glue is coated on the surface of the pre-stripping section of the optical fiber at a time, and the covering glue is controlled to solidify in sections to form different light stripping rates, which can greatly reduce the manufacturing process of the fiber cladding light stripper to achieve the purpose of reducing production costs.

Preferably, preset light curing device comprises a light source capable of emitting an ultraviolet light beam, a galvanometer set provided on one side of the light source for receiving the ultraviolet light beam and generating a moving light spot, and a field lens arranged between the galvanometer set and the optical fiber to focus and homogenize the light spot.

Preferably, the preset light curing device comprises a preset transfer fixture that moves along a preset track with a gradual movement of fast first and then slow or slow first and then fast. The preset transfer fixture is provided with a light source capable of emitting an ultraviolet light beam. The light source irradiates the covering glue to form a gradual exposure.

Preferably, the preset light curing device comprises a light source capable of emitting ultraviolet light, and an attenuator provided on one side of the light source to receive the ultraviolet light and generate a gradual irradiation intensity.

Preferably, the preset light curing device comprises a light source capable of emitting ultraviolet light, and a mask provided with a predetermined pattern inside. The mask is provided on the side of the light source to receive the ultraviolet light. The light source is set on one side of the mask at a predetermined inclination angle to generate a light spot with a gradual irradiation intensity. Thee predetermined pattern is a long rectangle, and the light spot is close to an egg shape.

DETAILED DESCRIPTION OF THE PREFERRED EMBODIMENT

In order to achieve the above-mentioned objects and effect, the technical means used in the present invention and its structure are drawn to illustrate in detail the features and functions of the preferred embodiments of the present invention as follows, so as to fully understand.

Figure 1:
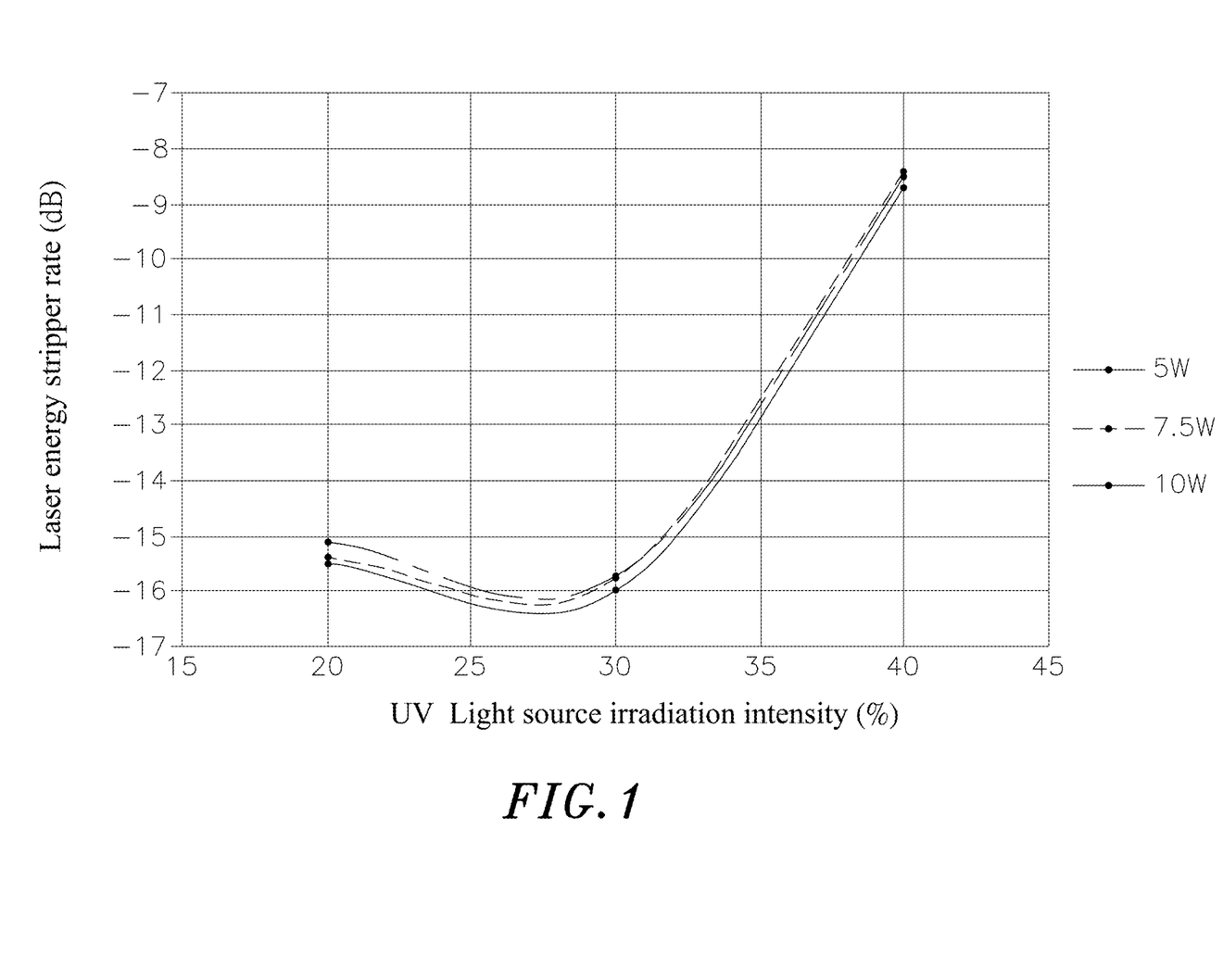
FIG. 1 is a graph of the laser energy stripping rate and the UV light source irradiation intensity during operation of the fiber cladding light stripper.

Please refer to FIG. 1, which is a graph of the stripping rate and irradiation intensity of the fiber cladding light stripper during operation, where X axis represents the percentage of UV light source irradiation intensity (Power), and the Y axis represents the laser energy stripper rate. Under the conditions of the same stripping length, coating glue, and exposure time of the optical fiber, the use of different irradiation intensities will also cause different laser energy stripper rate. It can be seen that the stripping rate is −15 dB, −16 dB and −8.5 dB at 20%, 30% and 40% of the UV light source irradiation intensity, respectively. Among them, the stripping rate is the highest at the UV light source irradiation intensity of 30%, but after the UV light source irradiation intensity exceeds 30%, it becomes lower as the UV light source irradiation intensity increases. Under the condition of the laser pump output power of 10 W, the highest temperature of 20%, 30% and 40% irradiation intensity is 54.5° C., 60.9° C. and 50.3° C., respectively. It can be seen from this figure that the laser energy stripper rate is directly proportional to the fiber temperature. If the amount of cladding stripped at the injection point of the fiber cladding light stripper is too large, the temperature rise rate will be more rapid and the fiber will be more likely to be burned. How to dissipate the high-order modal light in sections has become the research focus of the present invention, and it is implemented in the following embodiments.

Figure 2A:
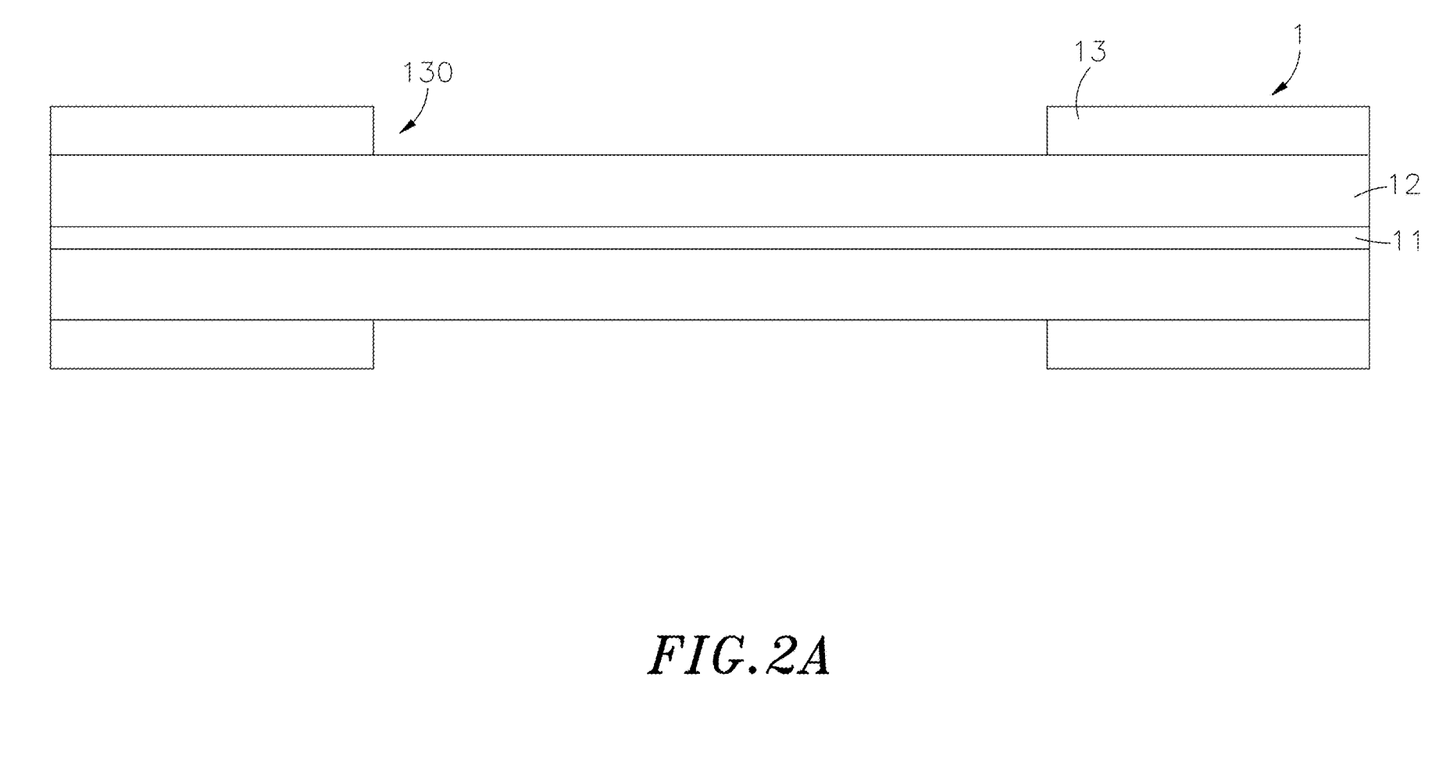
FIG. 2A is a schematic diagram of the partial removal of the optical fiber of the present invention in the outer coating.
Figure 2B:
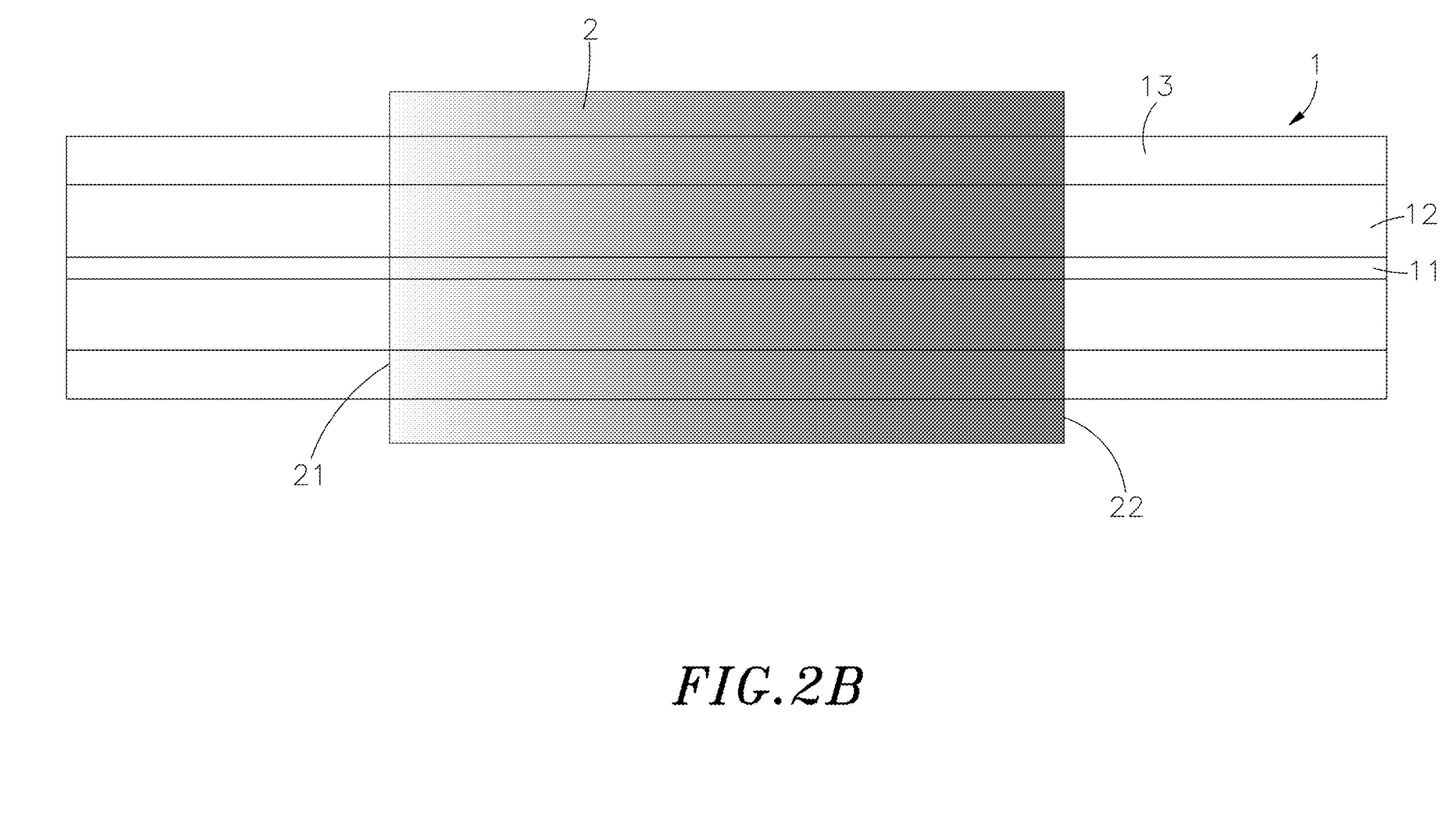
FIG. 2B is a structural diagram of the gradual fiber cladding light stripper of the present invention.
Figure 3A:
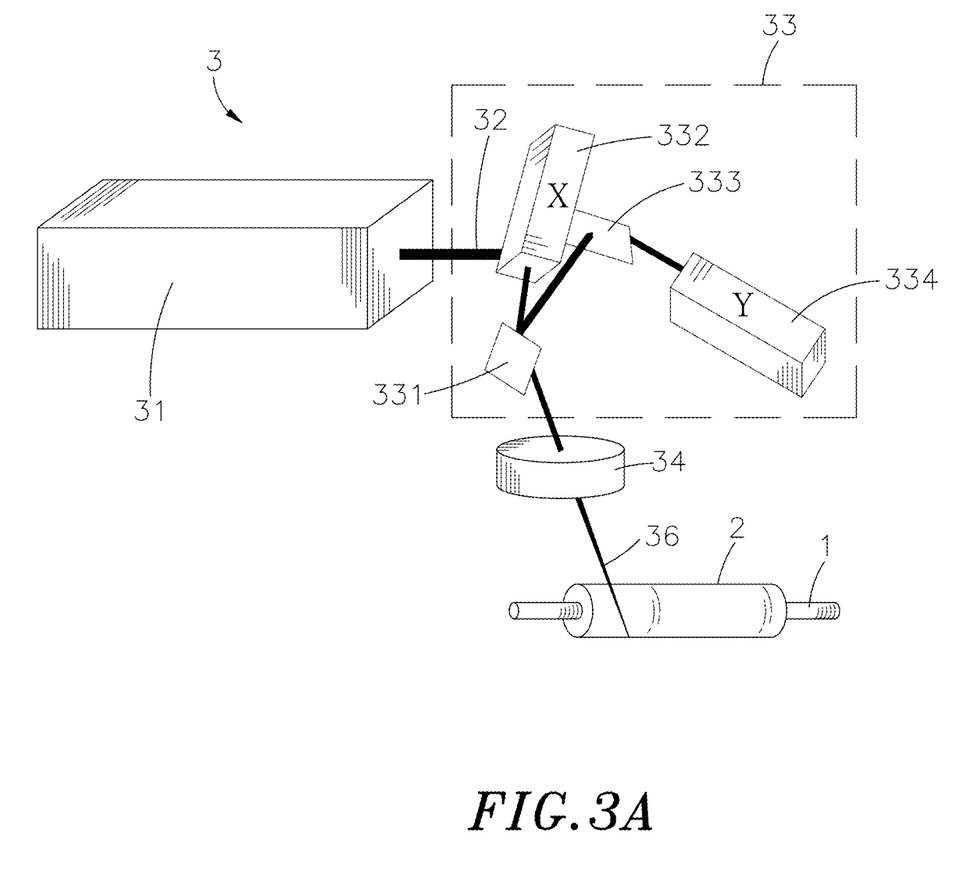
FIG. 3A is a diagram of the first embodiment of the gradual fiber cladding light stripper of the present invention during manufacture.
Figure 3B:
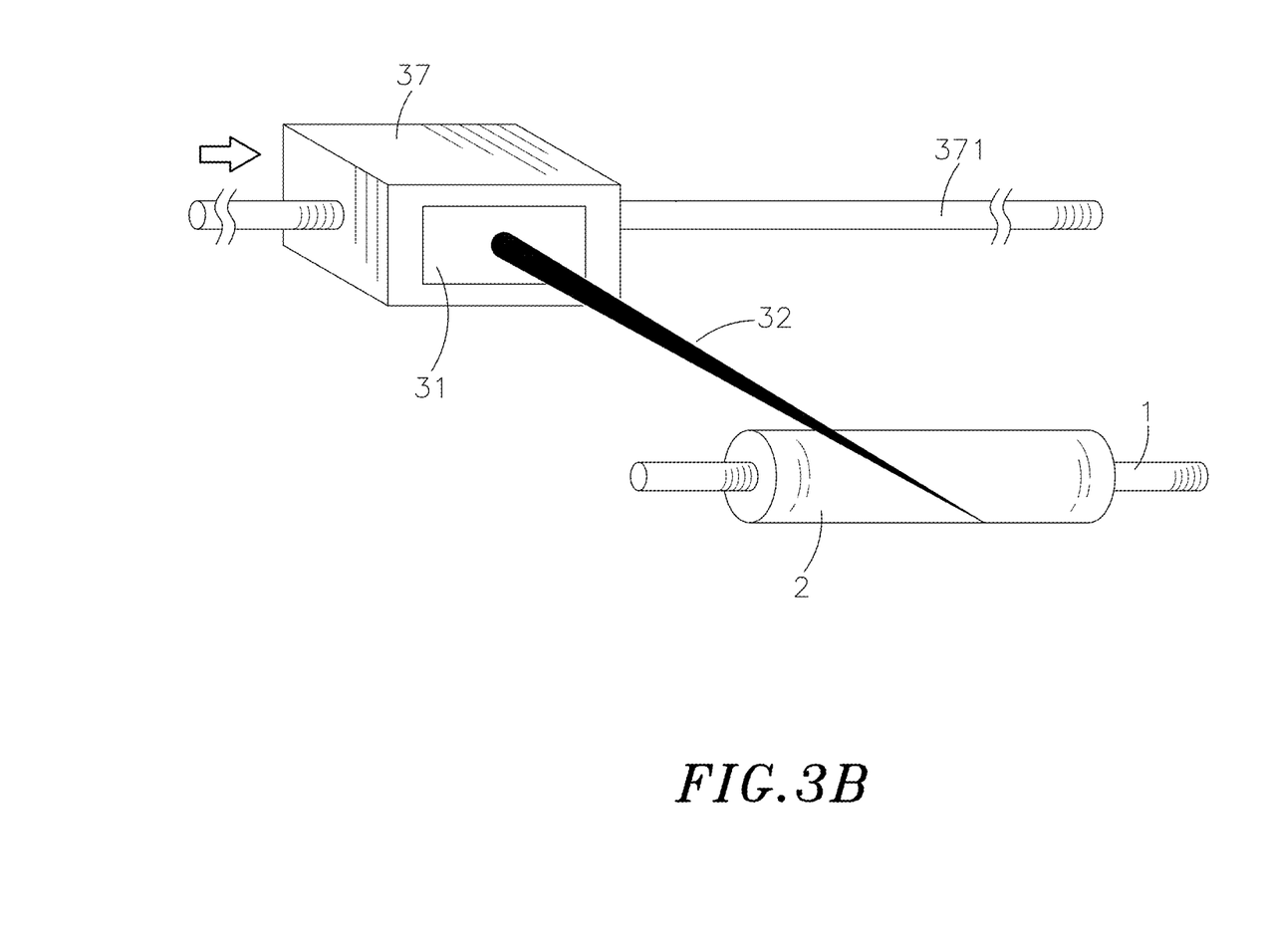
FIG. 3B is a diagram of the second embodiment of the gradual fiber cladding light stripper of the present invention during manufacture.
Figure 3C:
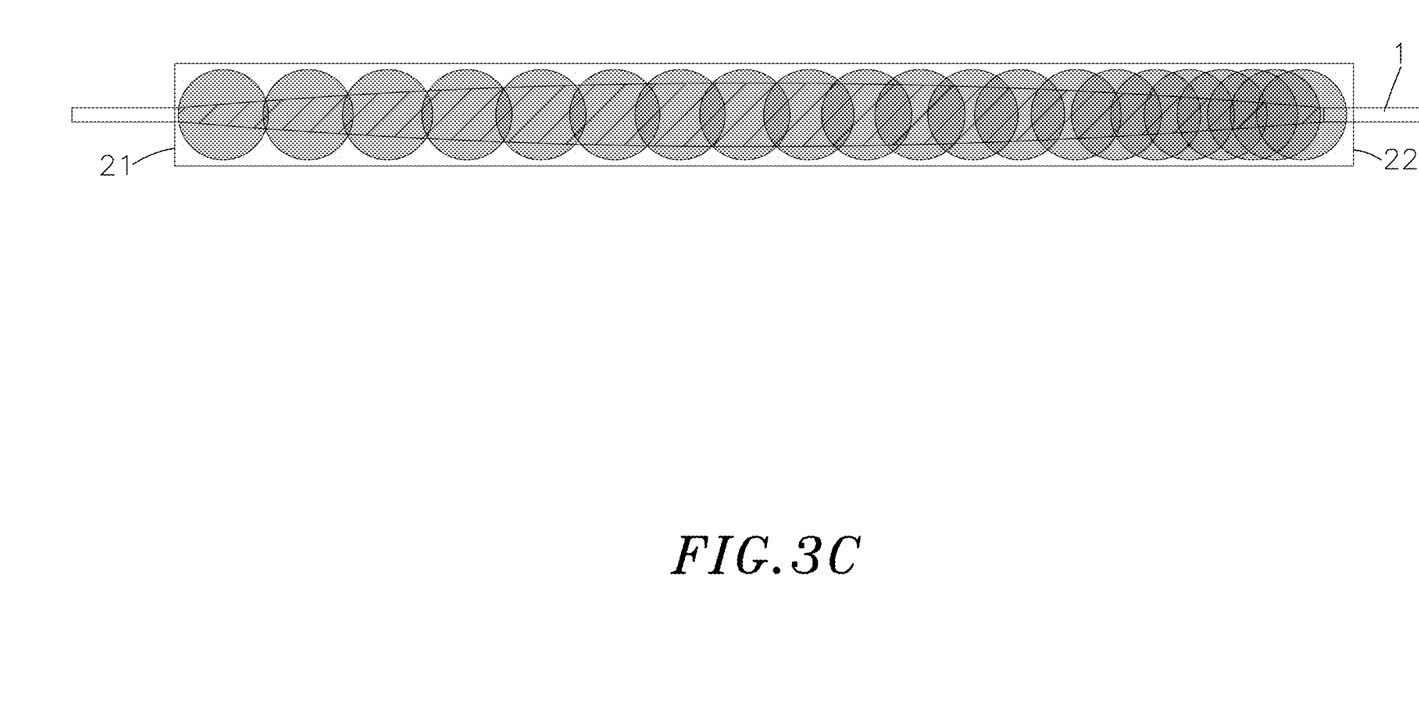
FIG. 3C is a schematic diagram of the formation of a gradual recoating section on the optical fiber when manufactured through the first and second embodiments of the present invention.

Please refer to FIGS. 2A-2B and FIGS. 3A-3C, where FIG. 2A is a schematic diagram of the partial removal of the optical fiber of the present invention in the outer coating, FIG. 2B is a structural diagram of the gradual fiber cladding light stripper of the present invention, FIG. 3A is a diagram of the first embodiment of the gradual fiber cladding light stripper of the present invention during manufacture, FIG. 3B is a diagram of the second embodiment of the gradual fiber cladding light stripper of the present invention during manufacture, and FIG. 3C is a schematic diagram of the formation of a gradual recoating section on the optical fiber when manufactured through the first and second embodiments of the present invention. The main structure of the gradual fiber cladding light stripper is detailed as follows:

An optical fiber 1 includes a core 11, a cladding 12 on the outside of the core 11, and an outer coating 13 on the outside of the cladding 12. The outer coating 13 is removed through a preset cutting fixture (not shown) to form a pre-stripping section 130.

A recoating section 2 is coated on the surface of the pre-stripping section 130 with a covering glue at one time. The covering glue is irradiated and cured by a preset light curing device 3 to form the recoating section 2 with a gradual light stripping rate, and the recoating section 2 has a structure in which the light stripping rate of a laser light input terminal 21 is relatively low and the light stripping rate of a laser light output terminal 22 is relatively high. In particular, since the aforementioned covering glue is a transparent gel, the UV light of the preset light curing device 3 can penetrate directly after irradiating the covering glue. Therefore, there is no need to consider the problem of rotating the optical fiber 1 to make it uniform, and the covering glue can be uniformly cured to form the recoating section 2.

Figure 2C:
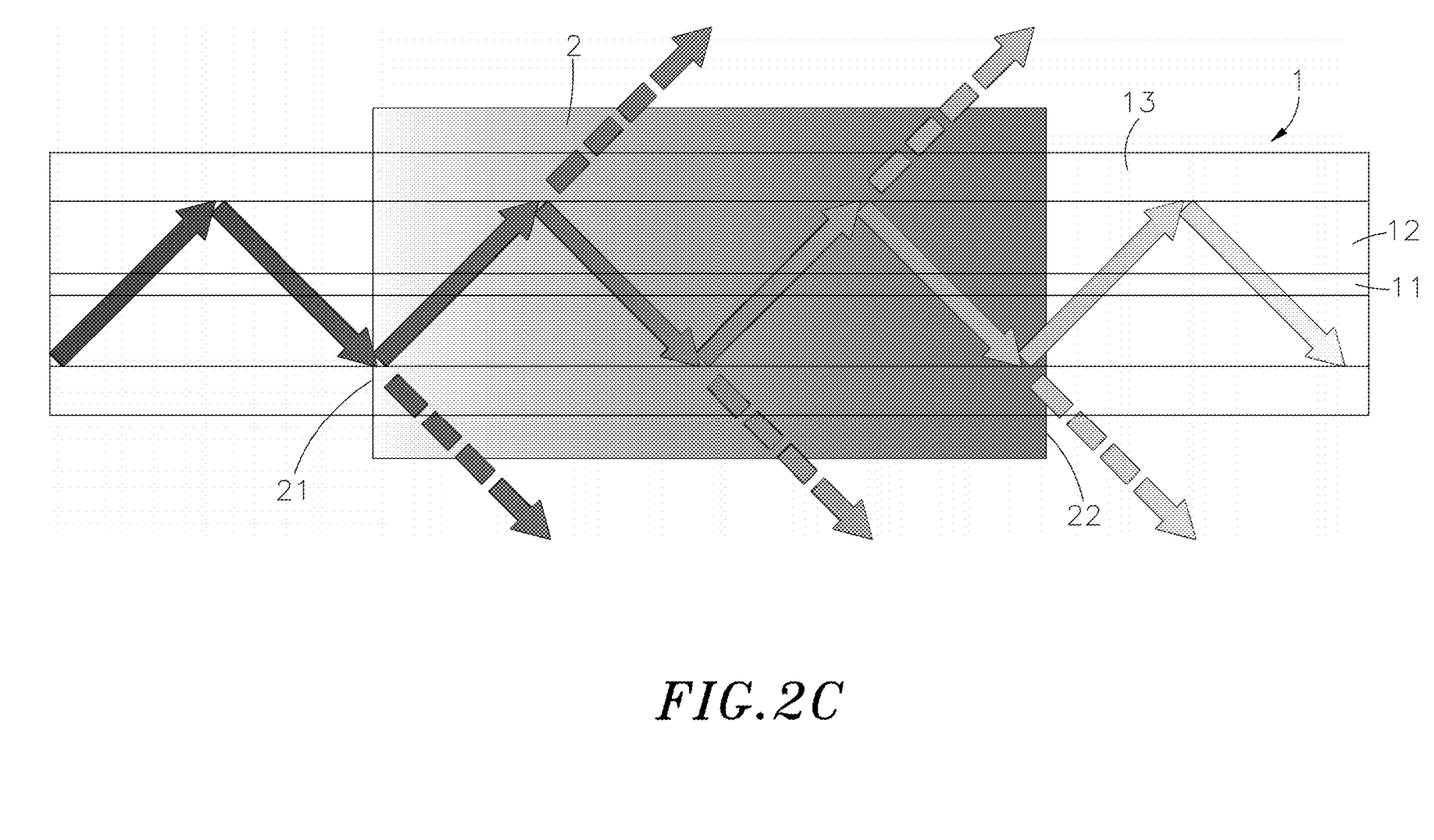
FIG. 2C is a light transfer simulation diagram of the gradual fiber cladding light stripper of the present invention.

Please refer to FIG. 2C, which is a light transfer simulation diagram of the gradual fiber cladding light stripper of the present invention. The transmission direction of the laser light is from left to right. Before the laser light reaches the laser light input terminal 21 of the recoating section 2 of the fiber cladding light stripper, the laser light can be totally reflected in the core 11 and the cladding 12 of the optical fiber 1. When reaching the recoating section 2, the total reflection condition will be destroyed, therefore, some energy is lost (such as the dotted line). Therefore, the longer the setting length of the recoating section 2, the more the loss of laser light. After the laser light passes through the laser light output terminal 22 of the recoating section 2, the remaining laser light energy will also be totally reflected in the optical fiber 1 for laser light transmission.

[First embodiment], as shown in FIG. 3A, the preset light curing device 3 comprises a light source 31 that can emit an ultraviolet light beam 32, a galvanometer set 33 provided on the side of the light source 31 to receive the ultraviolet light beam 32 and generate a moving light spot 36, and a field lens 34 arranged between the galvanometer set 33 and the optical fiber 1 to focus and homogenize the light spot 36, so that the ring-shaped recoating section 2 can be uniformly irradiated by the light spot 36.

The galvanometer set 33 receives the ultraviolet light beam 32 of the light source 31 and then deflects the ultraviolet light beam 32 in the X-axis and Y-axis directions, and homogenizes and focuses the ultraviolet light beam 32 through the field lens 34, thereby generating the light spot 36 of a circular plane or a rectangular plane. The aforementioned galvanometer set 33 comprises an X-axis galvanometer 331, an X-axis motor 332 that controls the X-axis galvanometer 331, a Y-axis galvanometer 333, and a Y-axis motor 334 that controls the Y-axis galvanometer 333. The principle of operation is: When the ultraviolet light beam 32 of the light source 31 is irradiated to the X-axis galvanometer 331 (or Y-axis galvanometer 333), the X-axis motor 332 (or Y-axis motor 334) continuously adjust the deflection angle of X-axis galvanometer 331 (or Y-axis galvanometer 333) through a control software (not shown), thereby adjusting the light spot 36 to irradiate the recoating section 2 on the surface of the optical fiber 1 in the X-axis and Y-axis directions. The light spot 36 is continuously moved to form a light-cured area, so that the ring-shaped recoating section 2 can be irradiated by the light spot 36 uniformly, and the cured recoating section 2 is as shown in FIG. 3C.

[Second embodiment], as shown in FIG. 3B, the preset light curing device 3 comprises a preset transfer fixture 37 that moves along a preset track 371 with a gradual movement of fast first and then slow or slow first and then fast. The preset transfer fixture 37 is provided with the light source 31 that can emit the ultraviolet light beam 32, so that the light source 31 irradiates the covering glue to form a gradual exposure, and the covering glue forms a recoating section 2 that can be uniformly irradiated by the light spot 36. The cured recoating section 2 is as shown in FIG. 3C.

The above FIGS. 3A, 3B, and 3C reveal a structure in which the recoating section 2 has a structure in which the light stripping rate of the laser light input terminal 21 is relatively low and the light stripping rate of the laser light output terminal 22 is relatively high. The stripping rate of optical fiber can be controlled in steps to form a gradual structure with a lower stripping rate closer to the laser light input terminal 21, and a higher stripping rate farther from the laser light input terminal 21. It avoids the burning of the optical fiber caused by the injection point of the fiber cladding light stripper due to the excessive amount of stripping.

Figure 4A:
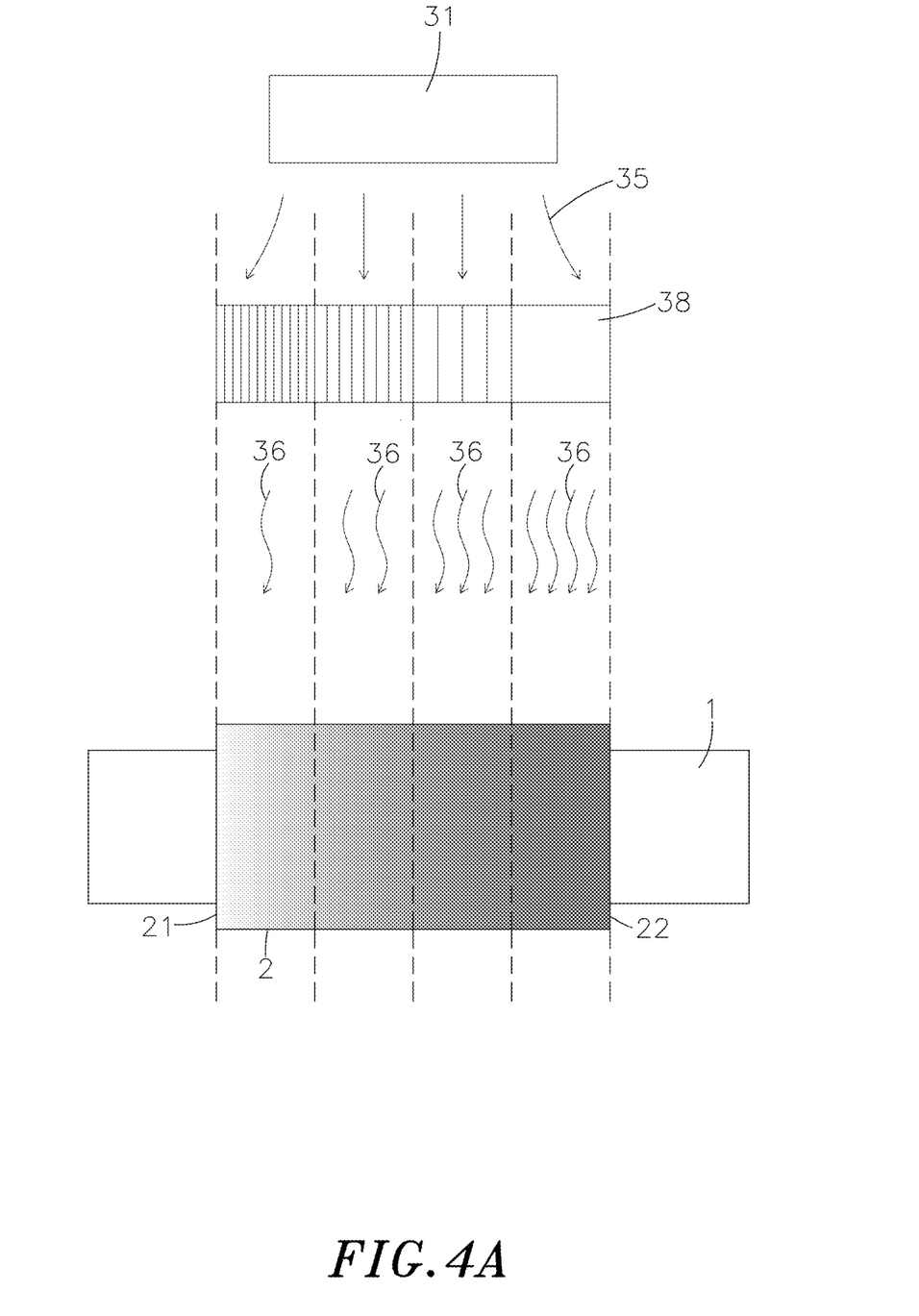
FIG. 4A is a diagram of the third embodiment of the gradual fiber cladding light stripper of the present invention during manufacture.
Figure 4B:
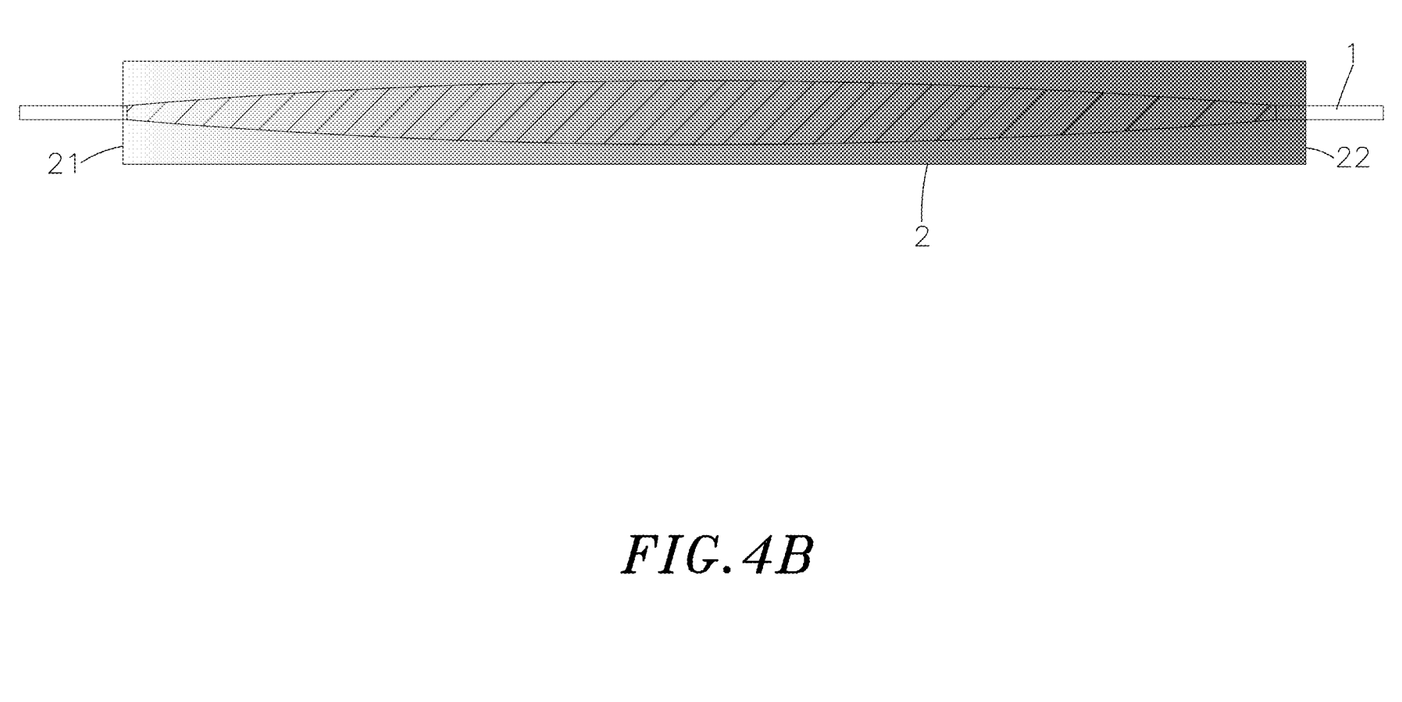
FIG. 4B is a schematic diagram of the formation of a gradual recoating section on the optical fiber when manufactured through the third embodiment of the present invention.

[Third embodiment], as shown in FIG. 4A, it is a diagram of the third embodiment of the gradual fiber cladding light stripper of the present invention during manufacture. The preset light curing device 3 comprises the light source 31 that can emit ultraviolet light 35, and an attenuator 38 provided on one side of the light source 31 to receive the ultraviolet light 35 and generate a gradual irradiation intensity. The attenuator 38 can be regarded as a lens with a built-in gradient grating. The ultraviolet light 35 passing through the attenuator 38 forms the light spot 36 irradiated on the recoating section 2, so that the ring-shaped recoating section 2 can be uniformly irradiated by the light spot 36. The cured recoating section 2 is as shown in FIG. 4B.

Figure 5A:
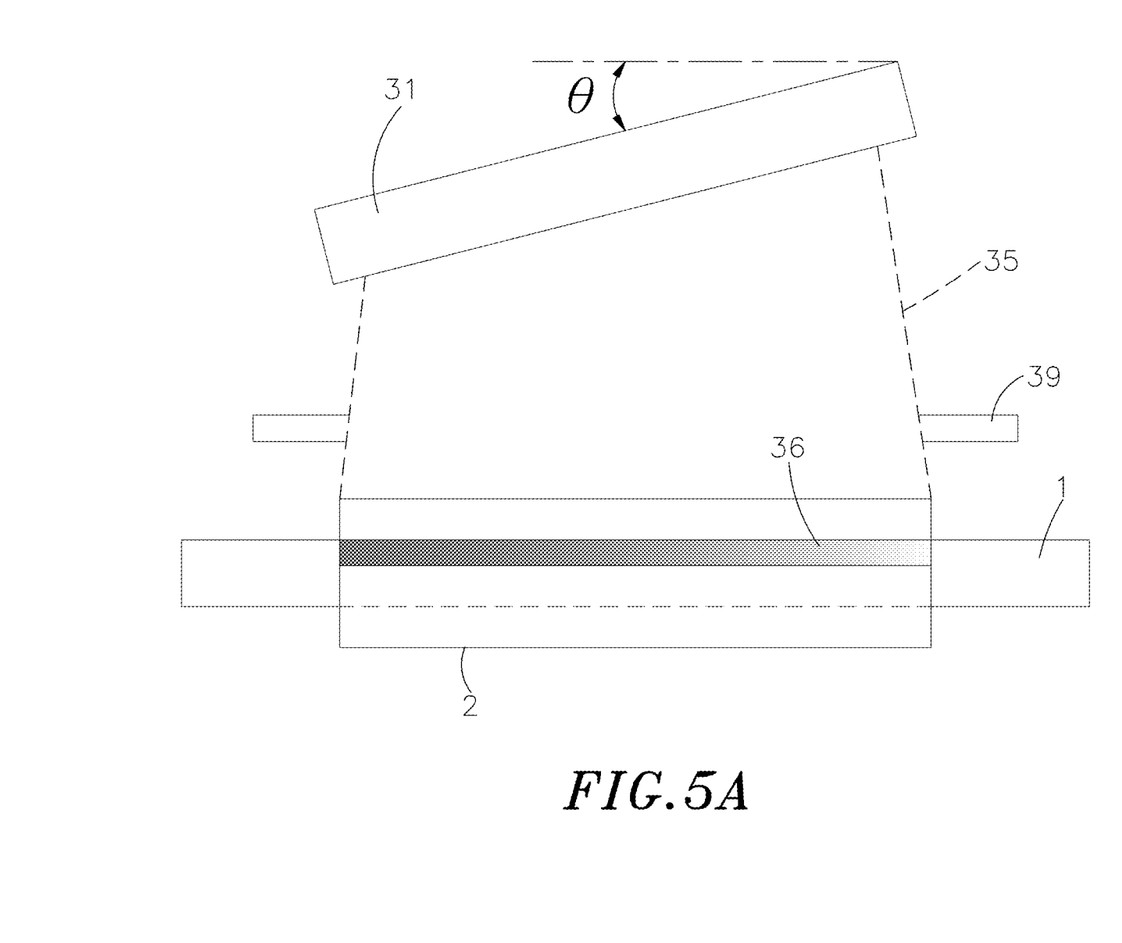
FIG. 5A is a diagram of the fourth embodiment of the gradual fiber cladding light stripper of the present invention during manufacture.
Figure 5B:
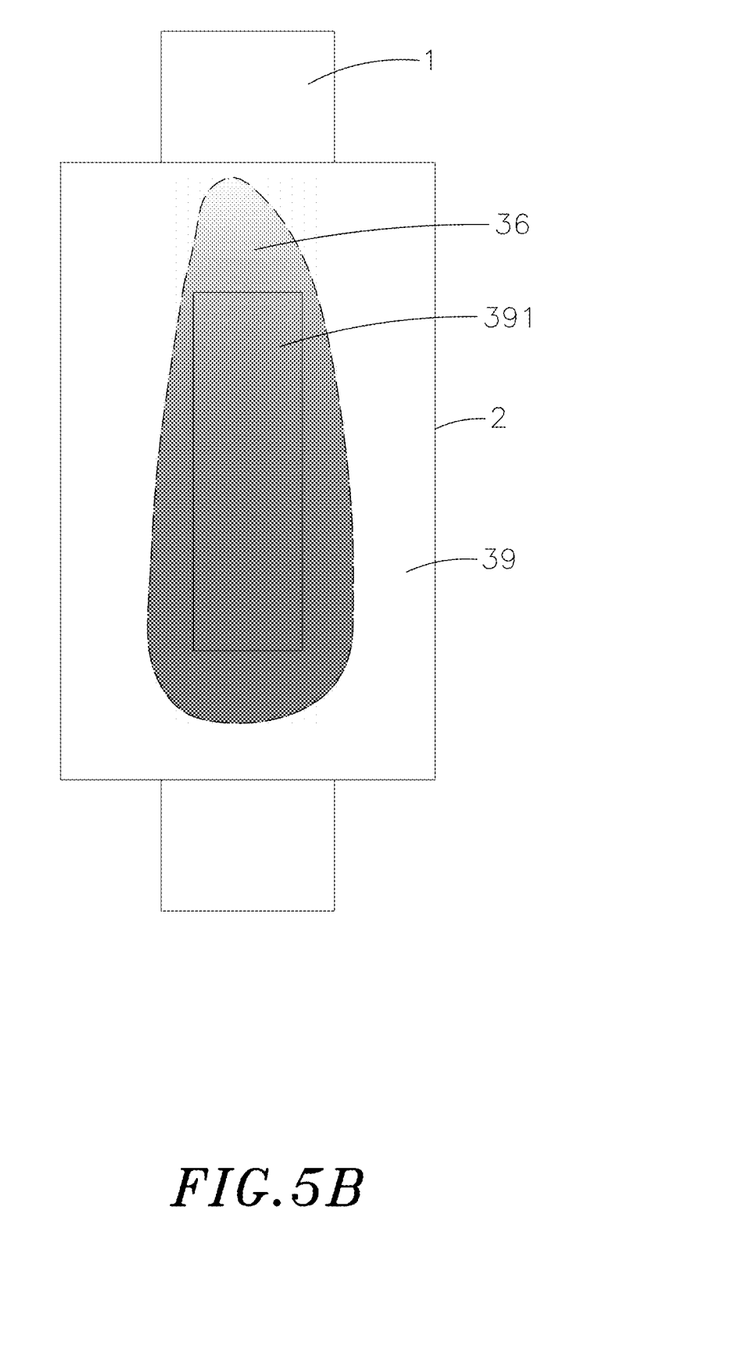
FIG. 5B is a schematic diagram of the formation of a gradual recoating section on the optical fiber when manufactured through the fourth embodiment of the present invention.

[Fourth embodiment], as shown in FIGS. 5A and 5B, which are a diagram of the fourth embodiment of the gradual fiber cladding light stripper of the present invention during manufacture and a schematic diagram of the formation of a gradual recoating section on the optical fiber when manufactured through the fourth embodiment of the present invention, the preset light curing device 3 comprises the light source 31 that can emit ultraviolet light 35, and a mask 39, which is provided with a predetermined pattern 391 inside, provided on the side of the light source 31 to receive the ultraviolet light 35. The light source 31 is set on one side of the mask 39 at a predetermined inclination angle θ to generate the light spot 36 with a gradual irradiation intensity. The predetermined pattern 391 is a long rectangle and the light spot 36 is close to an egg shape, so that the ring-shaped recoating section 2 can be uniformly irradiated by the light spot 36. The cured recoating section 2 also forms the structure disclosed in FIG. 4B.

Figure 6:
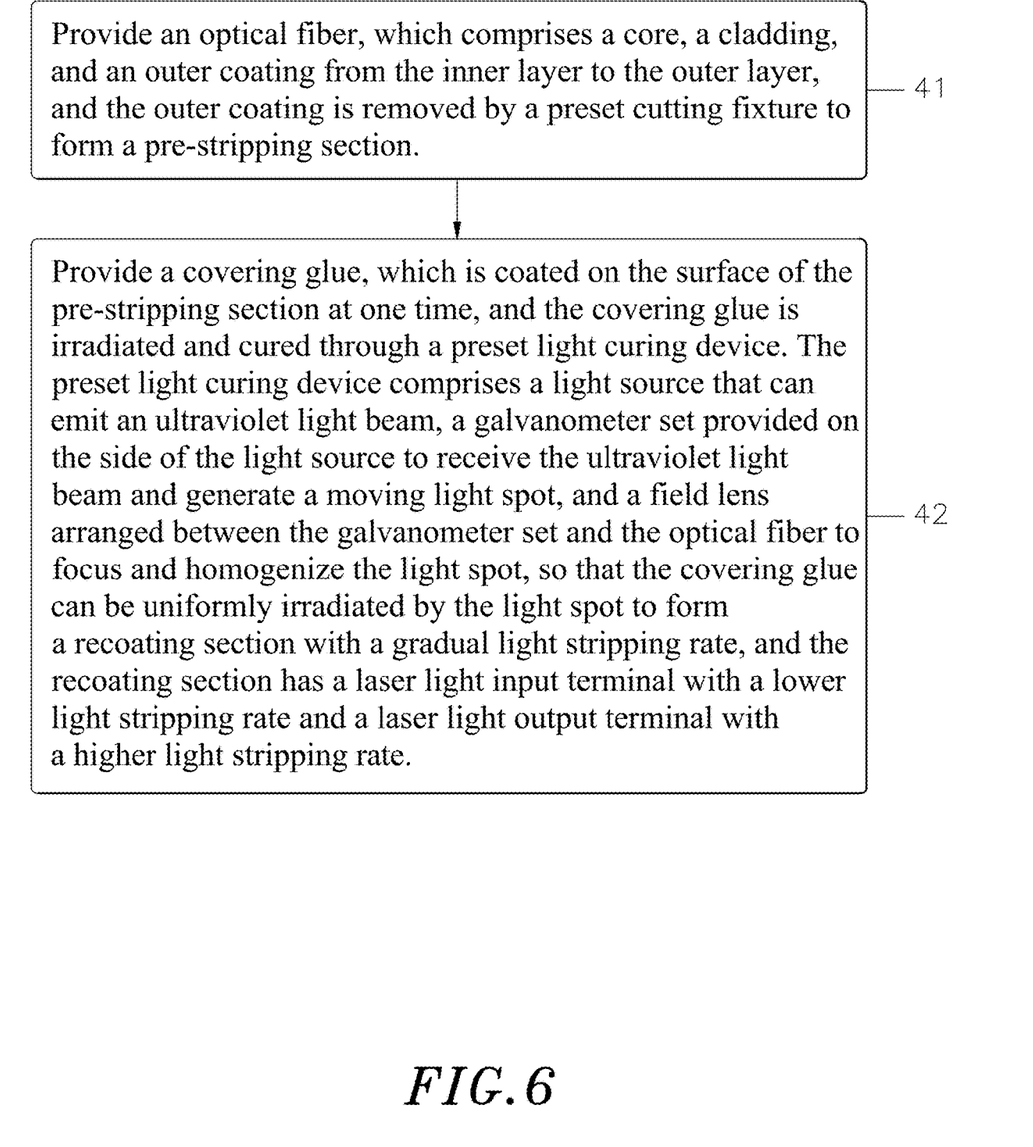
FIG. 6 is the first implementation flow chart of the manufacturing method of gradual fiber cladding light stripper of the present invention.

Please refer to FIG. 6, which is the first implementation flow chart of the manufacturing method of gradual fiber cladding light stripper of the present invention. Please also refer to the structure disclosed in FIGS. 2A, 3A, and 3C. The manufacturing method comprises the steps of:

Step 41: Provide an optical fiber, which comprises a core, a cladding, and an outer coating from the inner layer to the outer layer, and the outer coating is removed by a preset cutting fixture to form a pre-stripping section.

Step 42: Provide a covering glue, which is coated on the surface of the pre-stripping section at one time, and the covering glue is irradiated and cured through a preset light curing device. The preset light curing device comprises a light source that can emit an ultraviolet light beam, a galvanometer set provided on the side of the light source to receive the ultraviolet light beam and generate a moving light spot, and a field lens arranged between the galvanometer set and the optical fiber to focus and homogenize the light spot, so that the covering glue can be uniformly irradiated by the light spot to form a recoating section with a gradual light stripping rate, and the recoating section has a laser light input terminal with a lower light stripping rate and a laser light output terminal with a higher light stripping rate.

Figure 7:
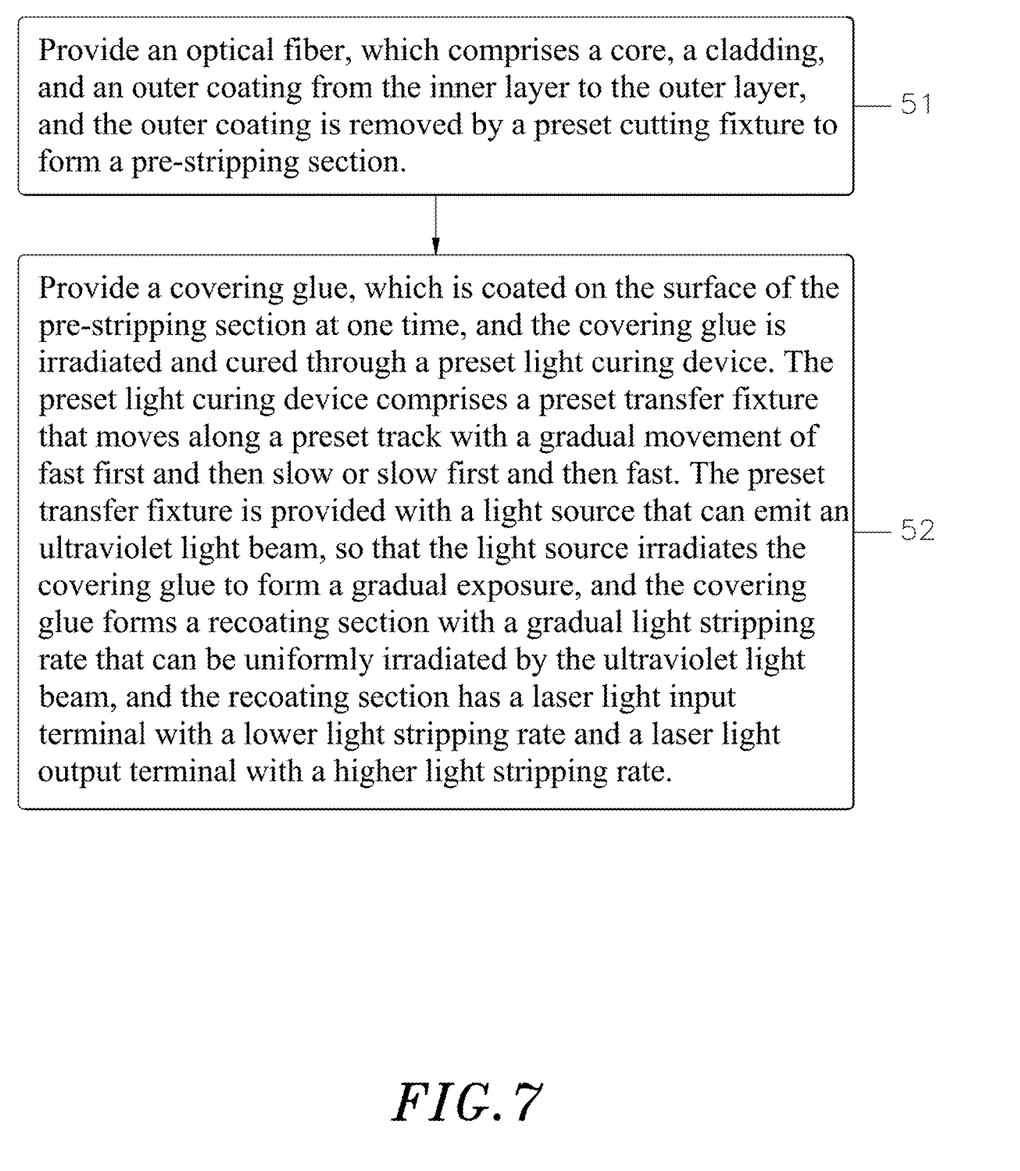
FIG. 7 is the second implementation flow chart of the manufacturing method of gradual fiber cladding light stripper of the present invention.

Please refer to FIG. 7, which is the second implementation flow chart of the manufacturing method of gradual fiber cladding light stripper of the present invention. Please also refer to the structure disclosed in FIGS. 2A, 3B, and 3C. The manufacturing method comprises the steps of:

Step 51: Provide an optical fiber, which comprises a core, a cladding, and an outer coating from the inner layer to the outer layer, and the outer coating is removed by a preset cutting fixture to form a pre-stripping section.

Step 52: Provide a covering glue, which is coated on the surface of the pre-stripping section at one time, and the covering glue is irradiated and cured through a preset light curing device. The preset light curing device comprises a preset transfer fixture that moves along a preset track with a gradual movement of fast first and then slow or slow first and then fast. The preset transfer fixture is provided with a light source that can emit an ultraviolet light beam, so that the light source irradiates the covering glue to form a gradual exposure, and the covering glue forms a recoating section with a gradual light stripping rate that can be uniformly irradiated by the ultraviolet light beam, and the recoating section has a laser light input terminal with a lower light stripping rate and a laser light output terminal with a higher light stripping rate.

Figure 8:
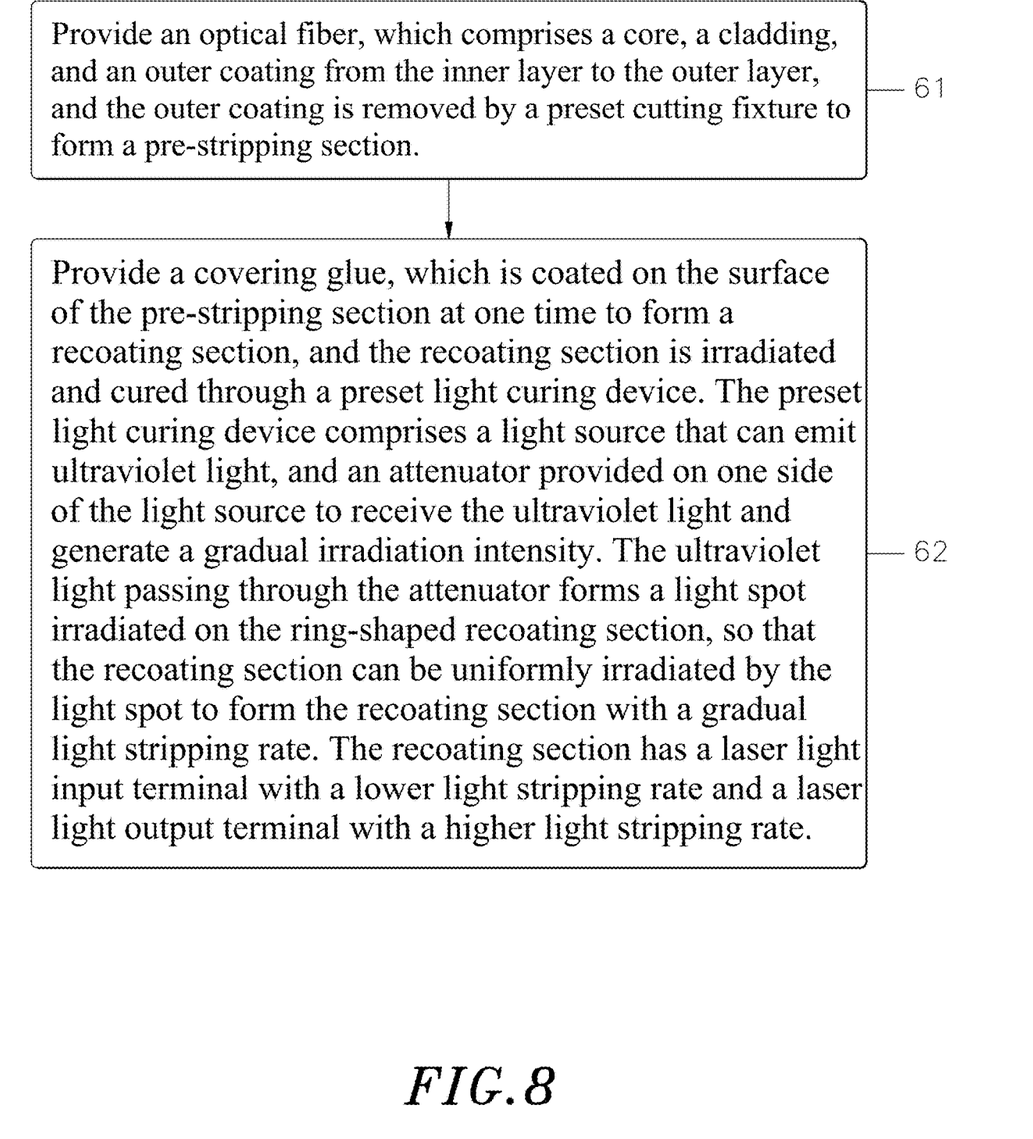
FIG. 8 is the third implementation flow chart of the manufacturing method of gradual fiber cladding light stripper of the present invention.

Please refer to FIG. 8, which is the third implementation flow chart of the manufacturing method of gradual fiber cladding light stripper of the present invention. Please also refer to the structure disclosed in FIGS. 2A, 4A, and 4B. The manufacturing method comprises the steps of:

Step 61: Provide an optical fiber, which comprises a core, a cladding, and an outer coating from the inner layer to the outer layer, and the outer coating is removed by a preset cutting fixture to form a pre-stripping section.

Step 62: Provide a covering glue, which is coated on the surface of the pre-stripping section at one time to form a recoating section, and the recoating section is irradiated and cured through a preset light curing device. The preset light curing device comprises a light source that can emit ultraviolet light, and an attenuator provided on one side of the light source to receive the ultraviolet light and generate a gradual irradiation intensity. The ultraviolet light passing through the attenuator forms a light spot irradiated on the ring-shaped recoating section, so that the recoating section can be uniformly irradiated by the light spot to form the recoating section with a gradual light stripping rate. The recoating section has a laser light input terminal with a lower light stripping rate and a laser light output terminal with a higher light stripping rate.

Figure 9:
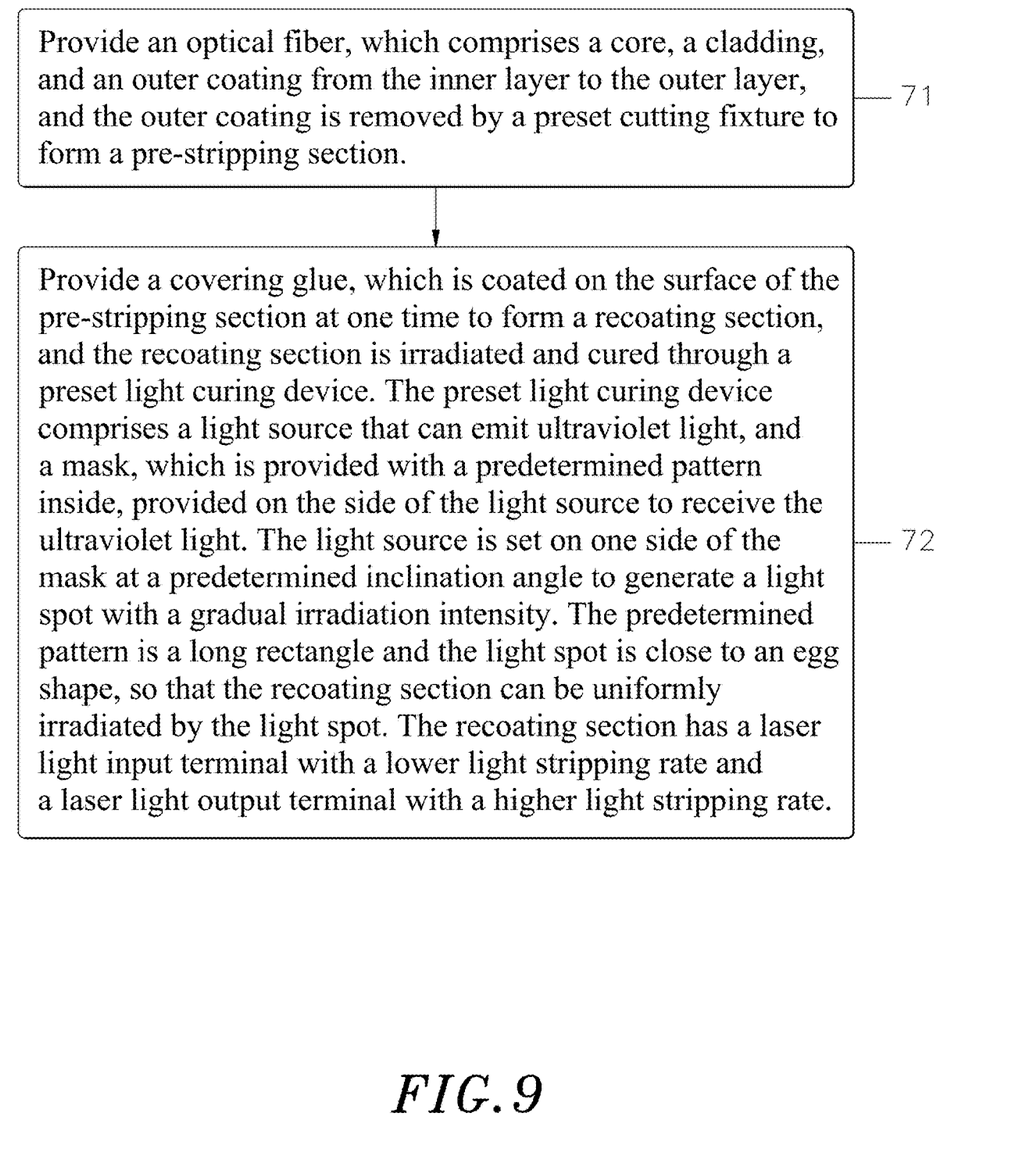
FIG. 9 is the fourth implementation flow chart of the manufacturing method of gradual fiber cladding light stripper of the present invention.

Please refer to FIG. 9, which is the fourth implementation flow chart of the manufacturing method of gradual fiber cladding light stripper of the present invention. Please also refer to the structure disclosed in FIGS. 2A, 4B, 5A and 5B. The manufacturing method comprises the steps of:

Step 71: Provide an optical fiber, which comprises a core, a cladding, and an outer coating from the inner layer to the outer layer, and the outer coating is removed by a preset cutting fixture to form a pre-stripping section.

Step 72: Provide a covering glue, which is coated on the surface of the pre-stripping section at one time to form a recoating section, and the recoating section is irradiated and cured through a preset light curing device. The preset light curing device comprises a light source that can emit ultraviolet light, and a mask, which is provided with a predetermined pattern inside, provided on the side of the light source to receive the ultraviolet light. The light source is set on one side of the mask at a predetermined inclination angle to generate a light spot with a gradual irradiation intensity. The predetermined pattern is a long rectangle and the light spot is close to an egg shape, so that the recoating section can be uniformly irradiated by the light spot. The recoating section has a laser light input terminal with a lower light stripping rate and a laser light output terminal with a higher light stripping rate.

According to the disclosure in FIGS. 1 to 9 above, it can be understood that the present invention is a gradual fiber cladding light stripper. The main feature is that the stripping rate of the optical fiber 1 is controlled in a stepwise manner to form a lower stripping rate closer to the laser light input terminal 21, and a higher stripping rate farther from the laser light input terminal 21. The gradual structure avoids the burning of the optical fiber 1 caused by the injection point of the fiber cladding light stripper due to the excessive stripping amount. At the same time, the covering glue is coated on the surface of the pre-stripping section 130 of the optical fiber 1 at a time, and the covering glue is controlled to solidify in sections to form different light stripping rates, which can greatly reduce the manufacturing process of the fiber cladding light stripper to achieve the purpose of reducing production costs. The invention is applied in the field of optical fiber lasers and has excellent practicability, so a patent application was filed to seek patent protection.

The above are only preferred embodiments of the present invention, and are not limited to the scope of the patent of the present invention. Therefore, all simple modifications and equivalent structural changes made by using the description and schematic content of the present invention should be included in the scope of the patent of the present invention in the same way.

In summary, the above-mentioned gradual fiber cladding light stripper and its manufacturing method of the present invention can indeed achieve its effect and purpose when used. Therefore, the present invention is an invention with excellent practicability. In order to meet the requirements of an invention patent application, an application is filed in accordance with the law. The inventor hopes that the review committee will grant the approval of this application as soon as possible to ensure the inventor's hard research and development.

What the invention claimed is:

1. A gradual fiber cladding light stripper manufacturing method, comprising the steps of:

B1: providing an optical fiber, said optical fiber comprising a core, a cladding and an outer coating from the inner layer to the outer layer, said outer coating being removed by a preset cutting fixture to form a pre-stripping section; and B2: providing a covering glue and coating said covering glue on the surface of said pre-stripping section at one time to form a recoating section, and then using a preset light curing device to irradiate and cure said recoating section, said preset light curing device comprising a light source capable of emitting ultraviolet light and an attenuator provided on one side of said light source to receive said ultraviolet light and generate a gradual irradiation intensity, said ultraviolet light passing through said attenuator to form a light spot that irradiates said recoating section, so that said recoating section is uniformly irradiated by said light spot to form said recoating section with a gradual light stripping rate, said recoating section comprising a laser light input terminal with a relatively lower light stripping rate and a laser light output terminal with a relatively higher light stripping rate.

* * * * *